(12) United States Patent
Rahman et al.

(10) Patent No.: US 11,556,966 B2
(45) Date of Patent: Jan. 17, 2023

(54) ITEM-TO-ITEM RECOMMENDATIONS

(71) Applicant: Walmart Apollo, LLC, Bentonville, AR (US)

(72) Inventors: Habibur Rahman, San Jose, CA (US); Sriram Guna Sekhar Kollipara, Sunnyvale, CA (US); Zeinab Taghavi Nasr Abadi, Oakland, CA (US); Jianpeng Xu, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 83 days.

(21) Appl. No.: 16/776,269

(22) Filed: Jan. 29, 2020

(65) Prior Publication Data

US 2021/0233124 A1    Jul. 29, 2021

(51) Int. Cl.
G06Q 30/00 (2012.01)
G06Q 30/02 (2012.01)
G06Q 30/06 (2012.01)
G06F 16/951 (2019.01)

(52) U.S. Cl.
CPC ....... *G06Q 30/0282* (2013.01); *G06F 16/951* (2019.01); *G06Q 30/0629* (2013.01); *G06Q 30/0631* (2013.01)

(58) Field of Classification Search
CPC .......... G06Q 30/0282; G06Q 30/0631; G06Q 30/0629; G06F 16/951
See application file for complete search history.

(56) References Cited

U.S. PATENT DOCUMENTS

| 7,676,400 | B1 | 3/2010 | Dillon |
| 7,698,170 | B1 | 4/2010 | Darr et al. |
| 7,720,723 | B2 | 5/2010 | Dicker et al. |
| 7,983,952 | B1 | 7/2011 | Dillon |
| 8,781,916 | B1 | 7/2014 | Buryak |
| 8,799,096 | B1 | 8/2014 | Dillon |
| 9,483,547 | B1 | 11/2016 | Feller et al. |

(Continued)

OTHER PUBLICATIONS

M. R. Azodinia and A. Hajdu, "A recommender system that deals with items having an image as well as quantitative features," 2015 IEEE 9th International Symposium on Intelligent Signal Processing (WISP) Proceedings, 2015, pp. 1-6, doi: 10.1109/WISP.2015.7139167. (Year: 2015).*

(Continued)

*Primary Examiner* — Sun M Li
(74) *Attorney, Agent, or Firm* — Morgan, Lewis & Bockius LLP; Manita Rawat

(57) ABSTRACT

An approach is disclosed for providing item-to-item recommendations. The approach receives data for an item. The approach generates recommended candidate item data for the data of the received item. The approach generates feature data of the recommended candidate item data and the data of the received item. The feature data may include one or more similarities between the data of the received item and data corresponding to a respective recommended candidate item. The approach generates ranked recommended candidate item data based on the generated feature data and at least one weight determined for candidate test item data. The candidate test item data may include data corresponding to the recommended candidate item data.

20 Claims, 14 Drawing Sheets

(56) References Cited

U.S. PATENT DOCUMENTS

| | | |
|---|---|---|
| 9,691,096 B1 | 6/2017 | Dai |
| 9,760,802 B2 | 9/2017 | Chen et al. |
| 9,818,145 B1 | 11/2017 | Finkelstein et al. |
| 9,852,193 B2 | 12/2017 | Chen et al. |
| 9,959,563 B1 | 5/2018 | Wu et al. |
| 10,055,778 B1 | 8/2018 | Dillon |
| 10,115,146 B1 | 10/2018 | Anderson et al. |
| 10,740,825 B1 | 8/2020 | Zhang et al. |
| 10,891,673 B1 | 1/2021 | Sawaf |
| 11,195,112 B2 | 12/2021 | Chee et al. |
| 2002/0010625 A1 | 1/2002 | Smith et al. |
| 2005/0102202 A1 | 5/2005 | Linden et al. |
| 2006/0020614 A1 | 1/2006 | Kolawa et al. |
| 2007/0118498 A1* | 5/2007 | Song .............. G06F 16/34 707/E17.093 |
| 2009/0099920 A1 | 4/2009 | Aharoni et al. |
| 2009/0234712 A1 | 9/2009 | Kolawa et al. |
| 2010/0191582 A1* | 7/2010 | Dicker .............. G06Q 30/0633 705/14.51 |
| 2010/0191619 A1 | 7/2010 | Dicker et al. |
| 2010/0268661 A1 | 10/2010 | Levy et al. |
| 2011/0082728 A1* | 4/2011 | Melikian .............. G06Q 30/0238 382/218 |
| 2011/0238525 A1 | 9/2011 | Linden et al. |
| 2011/0302155 A1 | 12/2011 | Yan et al. |
| 2012/0158552 A1 | 6/2012 | Smith |
| 2012/0253792 A1* | 10/2012 | Bespalov .............. G06F 16/353 704/9 |
| 2012/0259729 A1 | 10/2012 | Linden et al. |
| 2013/0097052 A1 | 4/2013 | Dicker et al. |
| 2013/0198030 A1 | 8/2013 | Linden et al. |
| 2013/0290110 A1 | 10/2013 | LuVogt et al. |
| 2013/0290339 A1 | 10/2013 | LuVogt et al. |
| 2013/0290905 A1 | 10/2013 | LuVogt et al. |
| 2013/0346234 A1 | 12/2013 | Hendrick et al. |
| 2014/0067597 A1 | 3/2014 | Kirkby et al. |
| 2014/0074649 A1 | 3/2014 | Patel et al. |
| 2014/0304032 A1 | 10/2014 | Mitchell et al. |
| 2015/0012345 A1 | 1/2015 | Bhagat et al. |
| 2015/0073931 A1 | 3/2015 | Ronen et al. |
| 2016/0005097 A1 | 1/2016 | Hsiao et al. |
| 2016/0048902 A1 | 2/2016 | Ward et al. |
| 2016/0188725 A1* | 6/2016 | Wang .............. G06F 16/9535 707/734 |
| 2016/0189257 A1 | 6/2016 | Dicker et al. |
| 2017/0083965 A1 | 3/2017 | Sun |
| 2017/0090867 A1 | 3/2017 | Lifar et al. |
| 2018/0060696 A1 | 3/2018 | Chen et al. |
| 2018/0336241 A1 | 11/2018 | Noh et al. |
| 2019/0163758 A1 | 5/2019 | Zhivotvorev et al. |
| 2019/0164069 A1 | 5/2019 | Zhivotvorev et al. |
| 2019/0197400 A1 | 6/2019 | Zhang et al. |
| 2019/0370879 A1 | 12/2019 | Bhattacharjee |
| 2020/0037207 A1 | 1/2020 | Centonza et al. |
| 2020/0372073 A1 | 11/2020 | Dahl et al. |
| 2021/0073891 A1 | 3/2021 | Al Jadda et al. |

OTHER PUBLICATIONS

J. Zhang, Y. Yang, Q. Tian, L. Zhuo and X. Liu, "Personalized Social Image Recommendation Method Based on User-Image-Tag Model," in IEEE Transactions on Multimedia, vol. 19, No. 11, pp. 2439-2449, Nov. 2017, doi: 10.1109/TMM.2017.2701641. (Year: 2017).*

U. Irmak, V. von Brzeski and R. Kraft, "Contextual Ranking of Keywords Using Click Data," 2009 IEEE 25th International Conference on Data Engineering, 2009, pp. 457-468, doi: 10.1109/ICDE.2009.76. (Year: 2009).*

F. Wu et al., "Learning of Multimodal Representations With Random Walks on the Click Graph," in IEEE Transactions on Image Processing, vol. 25, No. 2, pp. 630-642, Feb. 2016, doi: 10.1109/TIP.2015.2507401. (Year: 2016).*

Z. Yuan, J. Sang, C. Xu and Y. Liu, "A Unified Framework of Latent Feature Learning in Social Media," in IEEE Transactions on Multimedia, vol. 16, No. 6, pp. 1624-1635, Oct. 2014, doi: 10.1109/TMM.2014.2322338. (Year: 2014).*

Joshi Prateek, "Building a Recommendation System Using Word2vbec: A Unique Tutorial With Case Study Python", Analytics Vidhya, Jul. 30, 2019, 26 pages.

Iqbal, et al. "A Multimodal Recommender System for Large-scale Assortment Generation in E-commerce", ACM SIGAR Workshop on ecommerce, Jul. 2018, Ann Arbor, Michigan.

MasterCard launches MasterCard[R] priceless gift finder[TM] to help online shoppers find the perfect gift this holiday season. (Nov. 16, 2009). Business Wire Retrieved from https://dialog .proquest.com/professional/docview/1074708312?accountid= 161862 (Year: 2009).

Yang, et al., "A survey of collaborative filtering based on social recommendation systems" Computer Communications, Jul. 2021, 41: 1-10.

* cited by examiner

| | | Image Similarity Score 816 | Title Similarity Score 812 | Description Similarity Score 814 | Brand Similarity Score 808 | ... | ... | Product Type Similarity Score 810 | Label |
|---|---|---|---|---|---|---|---|---|---|
| 800 | 504/502 | 0.98 | 0.97 | 0.97 | 0.84 | ... | ... | 1.00 | +1 |
| 802 | 506/502 | 0.956 | 0.91 | 0.82 | 0.7 | ... | ... | 1.00 | +1 |
| 804 | 606/502 | 0.43 | 0.23 | 0.56 | 1.0 | ... | ... | 0.76 | -1 |

| | | Image Similarity Score 1014 | Title Similarity Score 1016 | Description Similarity Score 1018 | Brand Similarity Score 1020 | ... | ... | Product Type Similarity Score 1022 | |
|---|---|---|---|---|---|---|---|---|---|
| 1002 → 220 | 1008 | 0.93 | 0.85 | 0.879 | 0.84 | ... | ... | 1.00 | ? |
| 1004 → 220 | 1010 | 0.87 | 0.97 | 0.92 | 0.901 | ... | ... | 1.00 | ? |
| 1006 → 220 | 1012 | 0.72 | 0.45 | 0.52 | 1.0 | ... | ... | 0.66 | ? |

FIG. 10

ITEM-TO-ITEM RECOMMENDATIONS

TECHNICAL FIELD

The disclosure relates generally to providing item recommendations, and more particularly, to providing item-to-item recommendations based on feature comparison.

BACKGROUND

In some cases, when a customer purchases an item on an e-commerce website, the customer may select and add the item to the customer's online shopping cart. The e-commerce website may display the item on, for example, an add-to-cart page, and recommend items that complement the item added to the online shopping cart. In other cases, when a customer views an item on the e-commerce website, the website may display and recommend similar items to the item that the customer is currently viewing.

The e-commerce website may utilize conventional navigational models to recommend the complementary and/or similar items, and help customers discover more items for sale on the website. For example, for a given item A, a conventional navigational model may leverage various features of the item A and retrieve candidate items that are viewed and/or purchase with item A. The navigational model may rank these candidate items, and may recommend these candidate items to the customer. However, a typical catalog of items for sale on an e-commerce website may include about 80% cold start items. Cold start items may include items that are new and do not include user interaction data, such as co-view data and/or co-purchase data, or items that do not have enough user interaction data to recommend complimentary or similar items. As such, conventional navigational models may only recommend about 20% of the items within the catalog.

SUMMARY

The summary of the disclosure is given to aid understanding of providing item-to-item recommendations and not with an intent to limit the disclosure. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the systems, devices, and their methods of operation to achieve different effects. Certain aspects of the present disclosure provide a system, method, and non-transitory computer readable medium for providing item-to-item recommendations.

In one or more aspects, the disclosed technology relates to a system including a memory having instructions stored thereon, and a processor configured to read the instructions. In one or more cases, the processor is configured to read the instructions to receive data for an item. In one or more cases, the processor is configured to read the instructions to generate recommended candidate item data for the data of the received item. In one or more cases, the processor is configured to read the instructions to generate feature data of the recommended candidate item data and the data of the received item. In one or more cases, the feature data includes one or more similarities between the data of the received item and data corresponding to a respective recommended candidate item. In one or more cases, the processor is configured to read the instructions to generate ranked recommended candidate item data based on the generated feature data and at least one weight determined for candidate test item data. In one or more cases, the candidate test item data includes data corresponding to the recommended candidate item data.

In one or more other aspects, the disclosed technology relates to a method. In one or more cases, the method includes receiving data for an item. In one or more cases, the method includes generating recommended candidate item data for the data of the received item. In one or more cases, the method includes generating feature data of the recommended candidate item data and the data of the received item. In one or more case, the feature data includes one or more similarities between the data of the received item and data corresponding to a respective recommended candidate item. In one or more cases, the method includes generating ranked recommended candidate item data based on the generated feature data and at least one weight determined for candidate test item data. In one or more cases, the candidate test item data includes data corresponding to the recommended candidate item data.

In yet one or more other aspects, the disclosed technology relates to a computer program product. In one or more cases, the computer program product includes a non-transitory computer readable medium having program instructions stored thereon. In one or more cases, the program instructions are executable by one or more processors. In one or more cases, the program instructions include receiving data for an item. In one or more cases, the program instructions include generating recommended candidate item data for the data of the received item. In one or more cases, the program instructions include generating feature data of the recommended candidate item data and the data of the received item. In one or more cases, the feature data includes one or more similarities between the data of the received item and data corresponding to a respective recommended candidate item. In one or more cases, the program instructions include generating ranked recommended candidate item data based on the generated feature data and at least one weight determined for candidate test item data. In one or more cases, the candidate test item data includes data corresponding to the recommended candidate item data.

BRIEF DESCRIPTION OF THE DRAWINGS

The features and advantages of the present disclosure will be better understood when read in conjunction with the figures provided. Embodiments are provided in the figures for the purpose of illustrating aspects, and/or features, of the various embodiments, but the claims should not be limited to the precise arrangements, structures, features, aspects, methods, processes, assemblies, systems, or devices shown, and the arrangements, structures, features, aspects, methods, processes, assemblies, systems, and devices shown may be used singularly or in combination with other arrangements, structures, features, aspects, methods, processes, assemblies, systems, and devices.

FIG. 8 illustrates example feature vectors.

FIG. 10 illustrates example feature vectors.

DETAILED DESCRIPTION

Figure 1:
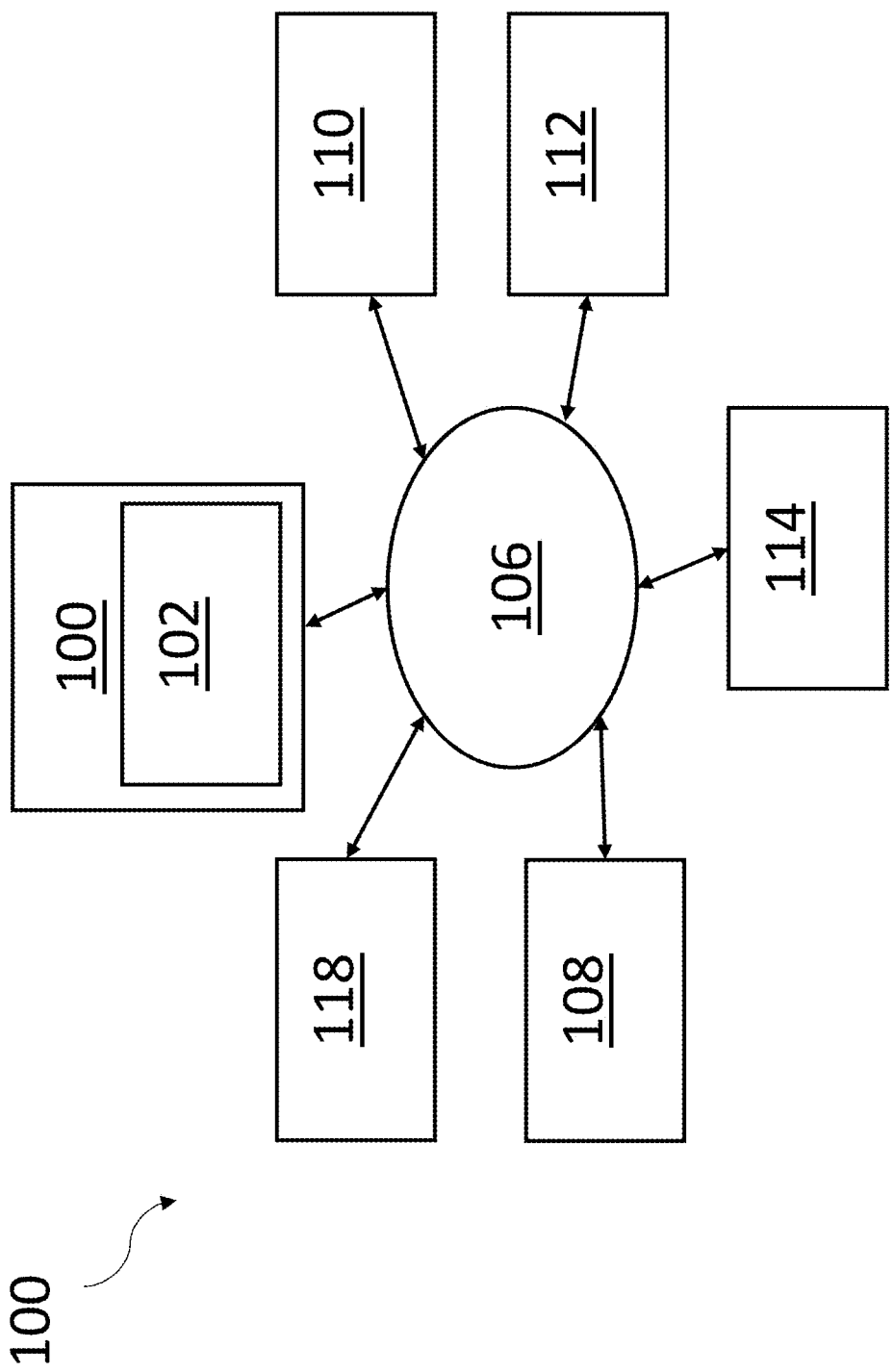
FIG. 1 is a functional block diagram of a data processing environment, in accordance with one or more embodiments.

The following discussion omits or only briefly describes conventional features of the data processing environment, which are apparent to those skilled in the art. It is noted that various embodiments are described in detail with reference to the drawings, in which like reference numerals represent like drawing elements throughout the figures. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. The objectives and advantages of the claimed subject matter will become more apparent from the following detailed description of these embodiments in connection with the accompanying drawings.

Unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Embodiments of the disclosure relate generally to providing item recommendations, and more particularly, to providing item-to-item recommendations based on feature comparison. Embodiments that provide personalized item-to-item recommendations are described below with reference to the figures.

FIG. 1 is a functional block diagram of a data processing environment 100. FIG. 1 provides only an illustration of one implementation and does not imply any limitations with regard to the environments in which different embodiments may be implemented. Many modifications of the depicted environment may be made by those skilled in the art without departing from the scope of the claims. In one or more cases, the data processing environment 100 includes a server 104, which operates an item recommendation system 102 (hereinafter "system 102"), a data storage repository 108, and one or more computing devices, such as computing device 118 and customer devices 110, 112, and 114 coupled over a network 106. The server 104, system 102, data storage repository 108, and devices 110, 112, 114, and 118 can each be any suitable computing device that includes any hardware or hardware and software combination for processing and handling information, and transmitting and receiving data among the server 104, system 102, data storage repository 108, and devices 110, 112, 114, and 118.

The server 104, system 102, data storage repository 108, and devices 110, 112, 114, and 118 can each include one or more processors, one or more field-programmable gate arrays (FPGAs), one or more application-specific integrated circuits (ASICs), one or more state machines, digital circuitry, or any other suitable circuitry.

The network 106 interconnects the server 104, the data storage repository 108, and one or more of the devices 110, 112, and 114. In general, the network 106 can be any combination of connections and protocols capable of supporting communication between the server 104, the data storage repository 108, one or more of the computing devices 110, 112, 114, and 118, and the system 102. For example, the network 106 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. In one or more cases, the network 106 may include wire cables, wireless communication links, fiber optic cables, routers, switches, firewalls, or any combination that can include wired, wireless, or fiber optic connections known by those skilled in the art.

In one or more cases, the server 104 hosts the system 102. In some cases, the server 104 may be a web server, a blade server, a mobile computing device, a laptop computer, a tablet computer, a netbook computer, a personal computer (PC), a desktop computer, or any programmable electronic device or computing system capable of receiving and sending data, via the network 106, and performing computer-readable program instructions. For example, for the cases in which the server 104 is a web server, the server 104 may host one or more pages of a website. Each of the computing devices 110, 112, 114, and 118 may be operable to view, access, and interact with the web pages hosted by the server 104. In one or more examples, the server 104 hosts a website, such as an e-commerce website, for a retailer to sell items and for a customer to purchase and/or view an item via one or more web pages. For example, a user of a computing device, such as the computing device 110, 112, or 114, may access a web page, add one or more items to an online shopping cart, and perform an online checkout of the shopping cart to purchase the items. In another example, a user of the computing device 118 may access one or more aspects of the system 102, for instance, to upload an item to the e-commerce website. In other cases, the server 104 can be a data center, which includes a collection of networks and servers, such as virtual servers and applications deployed on virtual servers, providing an external party access to the system 102. In some other cases, the server 104 represents a computing system utilizing clustered computers and components (e.g., database server computer, application server computers, etc.) that act as a single pool of seamless resources, such as in a cloud computing environment, when accessed within data processing environment 100.

In one or more cases, the data storage repository 108 may be one of, a web server, a mobile computing device, a laptop computer, a tablet computer, a netbook computer, a personal computer (PC), a desktop computer, or any programmable electronic device or computing system capable of receiving, storing, sending data, and performing computer readable program instructions capable of communicating with the server 104, computing devices 110, 112, 114, and 118, via network 106. In one or more cases, the data storage repository 108 may represent virtual instances operating on a computing system utilizing clustered computers and components (e.g., database server computer, application server computers, etc.) that act as a single pool of seamless resources when accessed within data processing environment 100. In one or more cases, the data storage repository 108 may be a remote storage device. In one or more other cases, the data storage repository 108 may be a local storage device on the server 104. For example, the data storage repository 108 may be, but not limited to, a hard drive, non-volatile memory, or a USB stick.

In one or more cases, devices 110, 112, 114, and 118 are clients to the server 104. The devices 110, 112, 114, and 118 may be, for example, a desktop computer, a laptop computer, a tablet computer, a personal digital assistant (PDA), a smart phone, a thin client, a voice assistant device, a digital assistant, or any other electronic device or computing system capable of communicating with server 104 through network 102. For example, device 118 may be a desktop computer capable of connecting to the network 106 to upload an item to the system 102. In another example, the device 112 may be a mobile device capable of connecting to the network 106 and receiving an input to add an item to a customer's online shopping cart on the e-commerce website. In one or more cases, one or more of the devices 110, 112, 114, and 118 may be any suitable type of mobile device capable of running mobile applications, including smart phones, tablets, slate, or any type of device that runs a mobile operating system.

In one or more cases, one or more of the devices 110, 112, 114, and 118 includes a user interface for providing an end user with the capability to interact with the system 102. For example, an end user of the computing device 118 may access the system 102 through the user interface to upload an item to sell on the e-commerce website. A user interface refers to the information (such as graphic, text, and sound) a program presents to a user and the control sequences the user employs to control the program. The user interface can be a graphical user interface (GUI). A GUI may allow users to interact with electronic devices, such as a keyboard and mouse, through graphical icons and visual indicators, such as secondary notations, as opposed to text-based interfaces, typed command labels, or text navigation. For example, the GUI may allow users to view, access, and interact with a website hosted on the server 104.

In one or more cases, one or more of the devices 110, 112, 114, and 118 can be any wearable electronic device, including wearable electronic devices affixed to, for example but not limited to, eyeglasses and sunglasses, helmets, wristwatches, clothing, and the like, and capable of sending, receiving, and processing data. For example, the device 110 may be a wearable electronic device, such as a wristwatch, capable of accessing an e-commerce website and receiving an input to add an item to a customer's cart on the e-commerce website.

Figure 2:
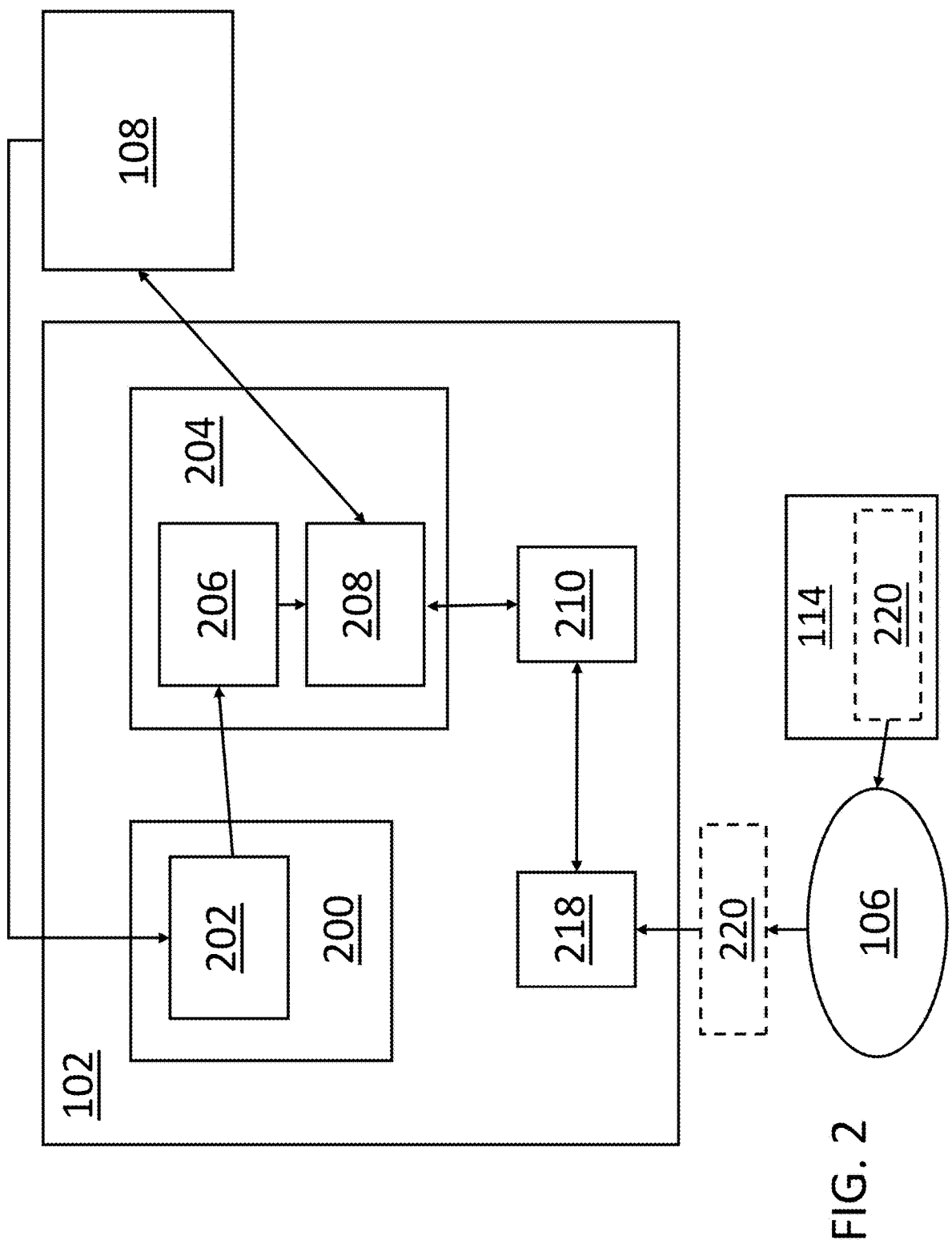
FIG. 2 is a functional block diagram illustrating components of the data processing environment of FIG. 1, in accordance with one or more embodiments.

FIG. 2 is a functional block diagram illustrating components of the data processing environment 100 of FIG. 1.

In one or more cases, the system 102 includes a model training environment 200, a model deployment environment 204, a model execution engine 210, and an item recommendation gateway 218. In one or more cases, the model training environment 200 may include a model training engine 202 configured to train an item recommendation model, as discussed herein, and store the item recommendation model in a model repository 206.

In one or more cases, the model deployment environment 204 may include the model repository 206 and a model deployment engine 208. The model repository 206 may store the item recommendation model and heuristics for the item recommendation model. In one or more cases, the model deployment engine 208 may retrieve and deploy the item recommendation model to the model execution engine 210 to output item recommendations for a received anchor item. It is noted that FIG. 2 illustrates the model repository 206 being stored in the model deployment environment 204; but it should be understood that the model repository 206 may be stored in one or more other repositories, which are remote from the system 102, including, but not limited to, the data storage repository 108.

In one or more cases, the model execution engine 210 may be configured to receive an anchor item, such as item 220, via the item recommendation gateway 218, and apply a deployed item recommendation model to the received anchor item, as discussed herein. In one or more cases, the item recommendation gateway 218 may be an application programming interface that facilitates communication between the system 102, in particular the model execution engine 210, and one or more devices, such as device 114, connected to the network 106.

In one or more examples, one or more of the model training engine 202, model deployment engine 208, and the model execution engine 210 may be implemented in hardware. In one or more examples, one or more of the model training engine 202, model deployment engine 208, and model execution engine 210 may be implemented as an executable program maintained in a tangible, non-transitory memory, such as instruction memory 1407 of FIG. 14, which may be executed by one or processors, such as processor 1401 of FIG. 14.

Figure 3:
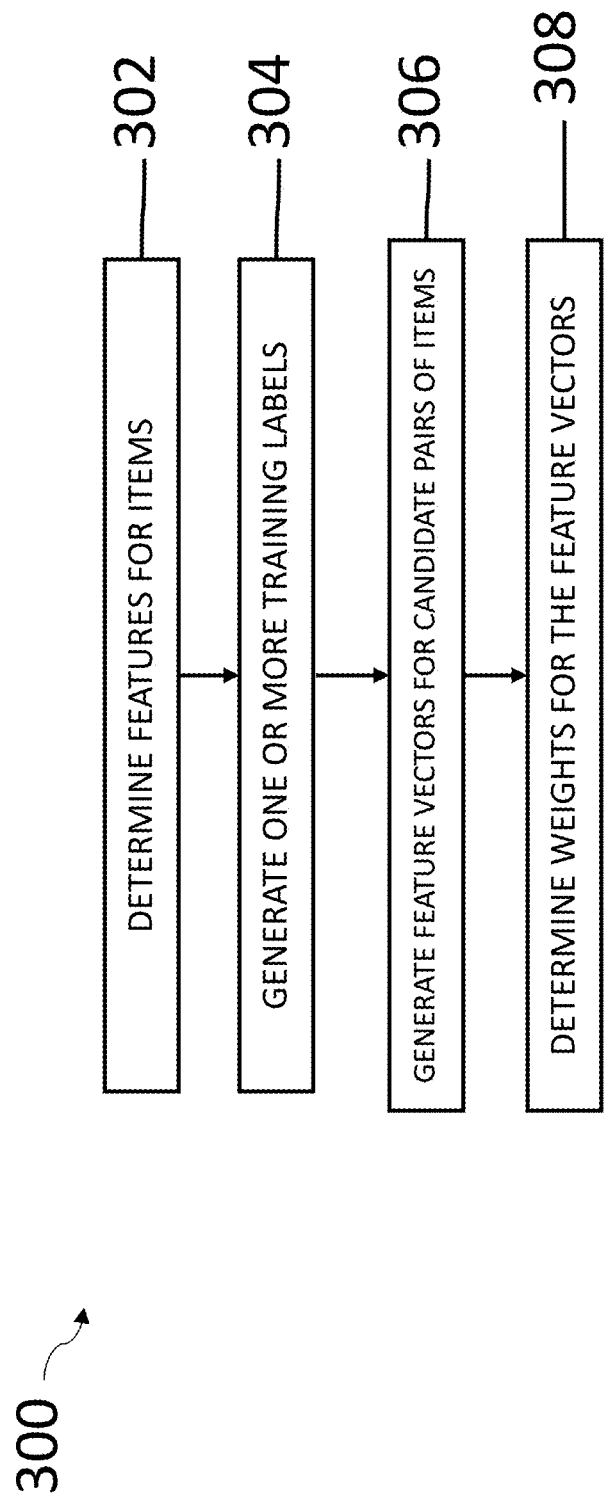
FIG. 3 is a flowchart illustrating a process of training an item recommendation model, in accordance with one or more embodiments.
Figure 4:
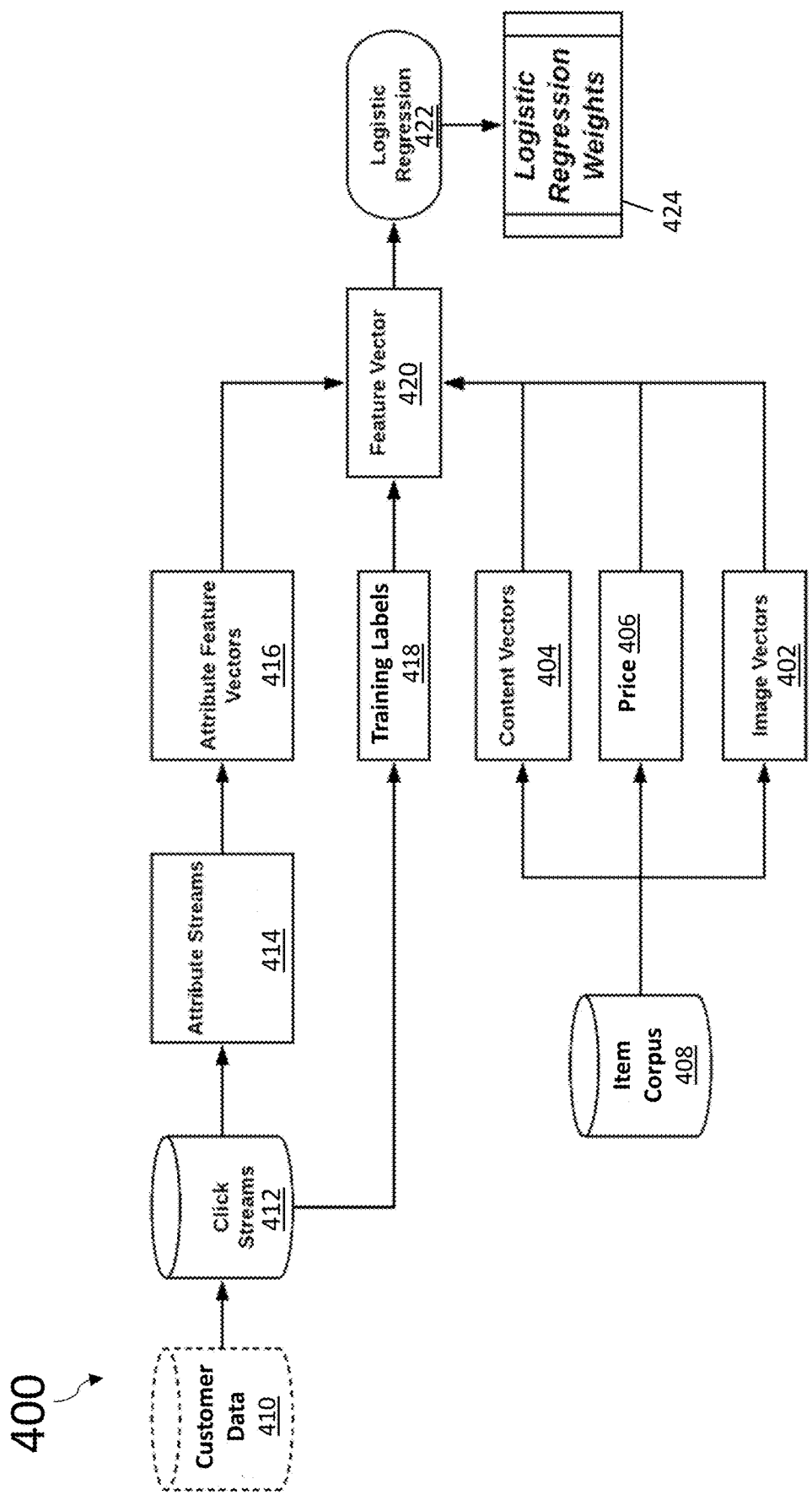
FIG. 4 illustrates an example process flow for generating weights of features applied to training the item recommendation model of FIG. 3.

FIG. 3 is a flowchart illustrating a process 300 of training the item recommendation model. FIG. 4 illustrates an example process flow 400 for generating weights of features applied to training the item recommendation model.

It is noted that, while the examples discussed herein are directed to training the item recommendation model with items that are or are complementary to couches and sofas, the embodiments discussed herein may train the item recommendation model based on any item and/or type of item offered for sale. Accordingly, the embodiments discussed herein are not limited to training the item recommendation model with items that are or are complementary to couches and sofas.

Features for items are determined (302), preferably by the model training engine 202. In one or more cases, the model training engine 202 may retrieve one or more items from the data storage repository 108 to extract feature data from features of the one or more items. A feature of an item may include one or more of the item's image, title, description, brand, reporting hierarchy (RH), primary shelf (PS), product type, price, and the like. The model training engine 202 may convert feature data into vectors (e.g., attribute feature vectors 416, content vectors 404, and/or image vectors 402) for the one or more items. The one or more items may be stored in an item corpus 400, which in one or more cases may be stored in the data storage repository 108. In one or more cases, an item may be a product offered for sale on the e-commerce website. In one or more cases, the model training engine 202 may determine one or more features for an item by extracting the feature data from these one or more features and converting the feature data to sequences of numbers, e.g., vectors. In one or more cases, for the features converted into vectors, the model training engine 202 may determine a degree of similarity between two items based on the distance between the vectors that correspond to each item. For example, two vectors separated by a short distance may indicate a degree of similarity between two products that is greater than two other vectors that are separated by a distance greater that the first two vectors.

An image of an item may be one of the first descriptive features that a customer sees when viewing the item on the e-commerce website. In one or more cases, the image of the item may include image data that is a sequence of numbers based on one or more of the intensity of the image, the colors of the image, and the like. In one or more cases, to determine image features for the item, the model training engine 202 may apply a deep learning method to embed the image data and reduce the dimensionality of the image data into a meaningful smaller dimensional space. For example, the model training engine 202 may utilize a deep learning method, such as, but not limited to, Google® Inception V3, to embed the image data. The model training engine 202 may dimensionally reduce the embedded image data by applying, for example, but not limited to, a latent semantic analysis (LSA) to the embedded image data. In one or more cases, the model training engine 202 may apply a cosine similarity to the dimensionally reduced image data of two items to determine the image similarity between the two items. The model training engine 202 may apply the cosine similarity to multiple sets of items to determine the image similarity between two items. In one or more cases, the model training engine 202 may represent the image data having reduced dimensionality as an image vector 402.

In one or more cases, an item may include one or both of a title and a description describing the item. In one or more cases, to determine one or both features related to the title and the description of the item, the model training engine 202 may apply a word embedding method to the text of the title and/or description of the item. Word embedding methods may include, for example but not limited to, a Term Frequency-Inverse Document Frequency (TF-IDF) method, a Word2Vec method, and the like. In one or more cases, the model training engine 202 may apply one or both TF-IDF and Word2Vec methods to the title of an item and/or to a description of an item. In one or more cases, the model training engine 202 may represent the results of one or both TF-IDF and Word2Vec methods as a content vector 404.

In one or more cases, the model training engine 202 may apply the TF-IDF method to weigh a keyword in any content and assign the importance (e.g., a TF-IDF score) to that keyword based on the number of times that the keyword appears in the document. For example, for a term t in a document d, the weight $W_{t,d}$ of term t in document d is given by:

$$W_{t,d} = TF_{t,d} * \log(N/DF_t)$$

in which $TF_{t,d}$ is the number of occurrences of t in document d; $DF_t$ is the number of documents containing the term t; and N is the total number of documents in the corpus, e.g., the corpus of items. For a given item text, the model training engine 202 may use Vector Space Model to represent each document as vectors, in which each dimension in a vector represents a word, and the value of the dimension is the TF-IDF score of that word.

In one or more cases, the model training engine 202 may apply the Word2Vec method to determine transitional probabilities between discrete states of words that occur one after the other. The model training engine 202 may use the Word2Vec method to establish a word's association with other words or clusters of documents, and may classify the words by topic. In one or more cases, the model training engine 202 may determine the similarities between words based on a number of times a pairing of words appears in, for example, a word vector lookup table. In one or more cases, the model training engine 202 may apply a cosine similarity method to the word vectors to determine a degree of similarity between the words.

In one or more cases, the model training engine 202 may determine the price feature by extracting the numerical attribute of the price from an item. In one or more cases, the model training engine 202 may represent the extracted numerical attribute, i.e., price 406, as a scalar value for the item.

In one or more cases, the model training engine 202 may determine the similarity of categorical features such as, but not limited to, brand, RH, PS, and product type features, based on click streams 412. In one or more cases, the model training engine 202 may generate attribute feature vectors 416 based on the similarity of categorical features. It is noted that the examples for generating attribute feature vectors 416 are discussed using one example click stream 500, but may be generated using multiple click streams 412. In one or more cases, the system 102 may track how a customer interacts with items on the e-commerce website. For example, a customer may click on several items during a session, for example, to view more details about the item. In one or more cases, a session may include a period of time in which a customer is actively engaged with the website, e.g., from a time-period a user lands on the website until a time period in which the user exits the website. In one or more cases, a customer may click on a series of items based on a similarity of one or more categorical features between the items. For example, a customer may click on items having a similar brand and/or a similar product type (e.g., sofas and couches). In one or more cases, the system 102 may save the customer data 410 (i.e., data indicating items in which the customer interacted in a session) and the click stream 412 (i.e., data indicating the order in which the customer clicked on the series of items) in the data storage repository 108. For example, the system 102 may determine a click stream 500 in which a customer clicked on Item 1 502, then Item 2 504, Item 3, 506, and Item 4 507 within a session of visiting the e-commerce website.

Figure 5:
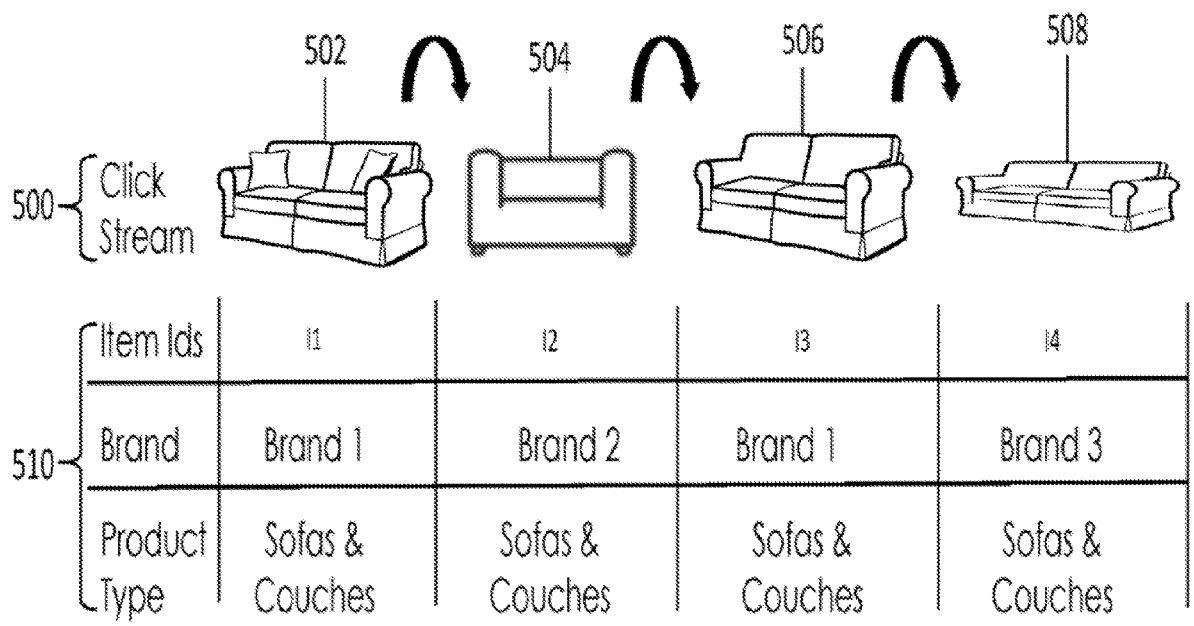
FIG. 5 illustrates an example click stream and attribute stream.
Figure 6:
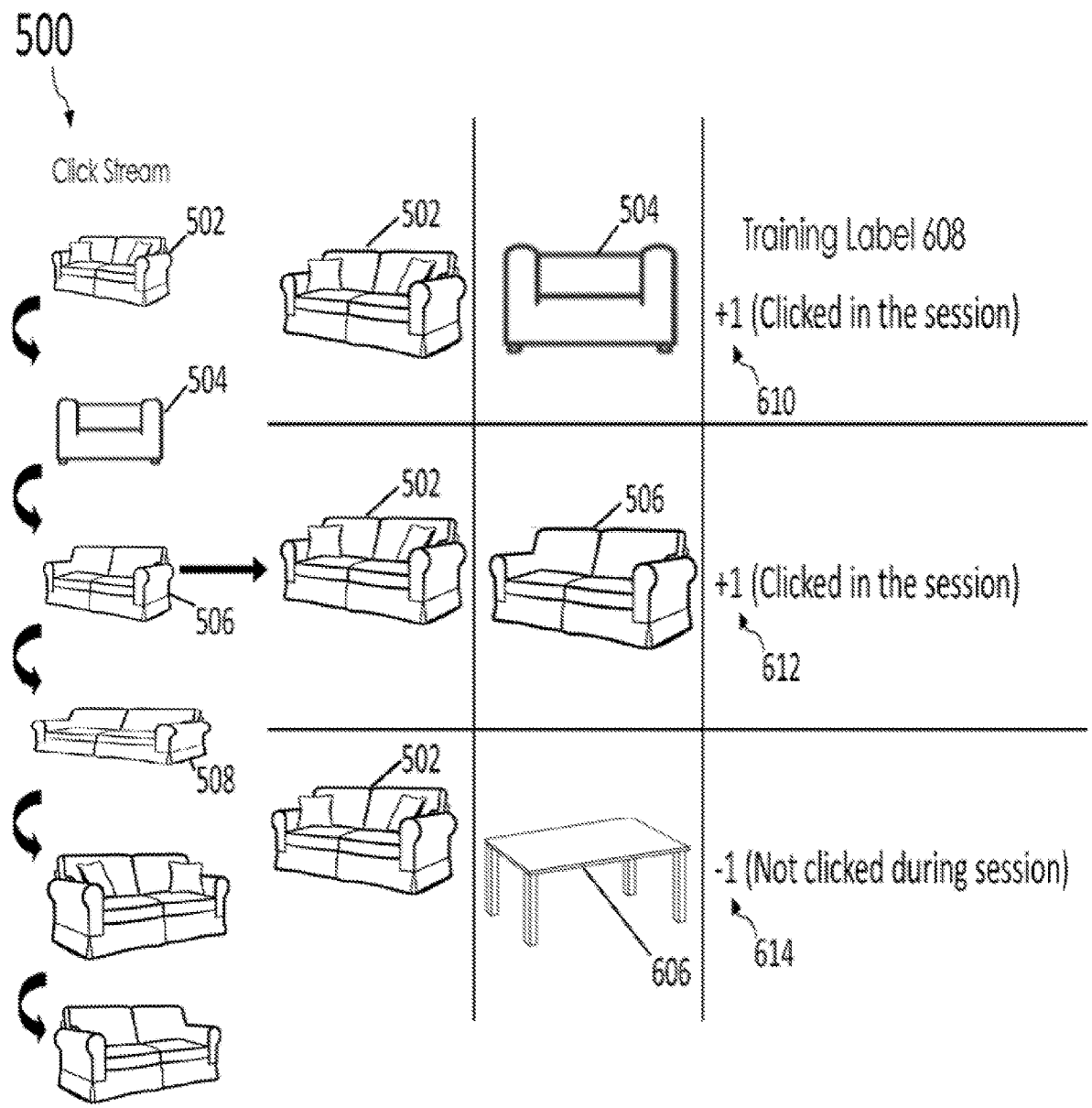
FIG. 6 illustrates example candidate pairs of items.

In one or more cases, the model training engine 202 may convert the click stream 412 of a session into an attribute stream 414. For example, having retrieved the click stream 500, the model training engine 202 may convert the click stream 500 into the attribute stream 510, as shown in FIG. 5, in order to determine the brand and product type similarities between Item 1 502, then Item 2 504, Item 3, 506, and Item 4 507. In one or more cases, the model training engine 202 may apply a word embedding method, for example, but not limited to, Word2Vec, to one or a combination of the brand RH, PS, and product type features within the click stream 412. It should be noted that the model training engine 202 may apply the word embedding method to other categorical features included within the click stream 412. Based on the output of the word embedding method, the model training engine 202 may determine the attribute feature vectors 416 for one or more of the brand features, the RH features, the PS features, the product type features, and any other categorical features included within the click stream 412. A RH may define the hierarchical categories to which the item belongs. In an example, a RH may include, in descending order, a division, super department, department, category, and top category. In another example, in ascending order of the hierarchy, Item 1 502 may a sofa that belongs to the sofa and couches category; the sofa and couches category may be a category within the living room furniture category; the living room furniture category may be a category within the furniture category; and the furniture category may be a category within the home, furniture & appliances category. A PS may define a hierarchy of product types to which an item belongs. In one or more cases, the model training engine 202 may apply a word embedding method to the PS product types for the one or more items within the click stream 412 and generates PS attribute feature vectors for the click stream 412.

One or more training labels 418 are generated (304), preferably by the model training engine 202. In one or more cases, the model training engine 202 may generate candidate pairs of items, in which each candidate pair includes an anchor item and an item that is relevant to the anchor item, i.e., a recommended item. A relevant item may include an item (e.g., recommended item 504, which is a sofa) that is similar to the anchor item (e.g., anchor item 502, which is a sofa) or an item (e.g., recommended item 606, which is an end table) that complements the anchor item. In one or more cases, the model training engine 202 may generate candidate pairs of items for a group of the most relevant items to the anchor item. For example, the model training engine 202 may generate candidate pairs of items for the top two hundred most relevant items (e.g., but not limited to, sofas, couches, end tables, and the like) to the anchor item 502. In one or more cases, the model training engine 202 may generate a training label 418 for one or more candidate pairs of items based on whether the relevant item is included in a click stream, e.g., click stream 500, that corresponds to the anchor item, e.g., anchor item 502. In one or more cases, a training label 418 may include candidate pairs of items, in which the model training engine 202 assigns a positive training label or a negative training label for the given candidate pair of items. The model training engine 202 may assign a positive training label to candidate pair of items in which one item is the anchor item, such as anchor item 502, and the other item is from the click stream 412, i.e., an item that a customer clicked on during a session. For example, the model training engine 202 may assign a positive training label 610 of +1 to the anchor item 502 and the recommended item 504. In another example, the model training engine 202 may assign a positive training label 612 of +1 to the anchor item 502 and the recommended item 506. The model training engine 202 may assign a negative training label to candidate pair of items in which one item is the anchor item and another item is not included in the click stream 412, i.e., an item that a customer did not click on during a session. For example, the model training engine 202 may assign a negative training label 614 of −1 to the anchor item 502 and the recommended item 606.

Figure 7:
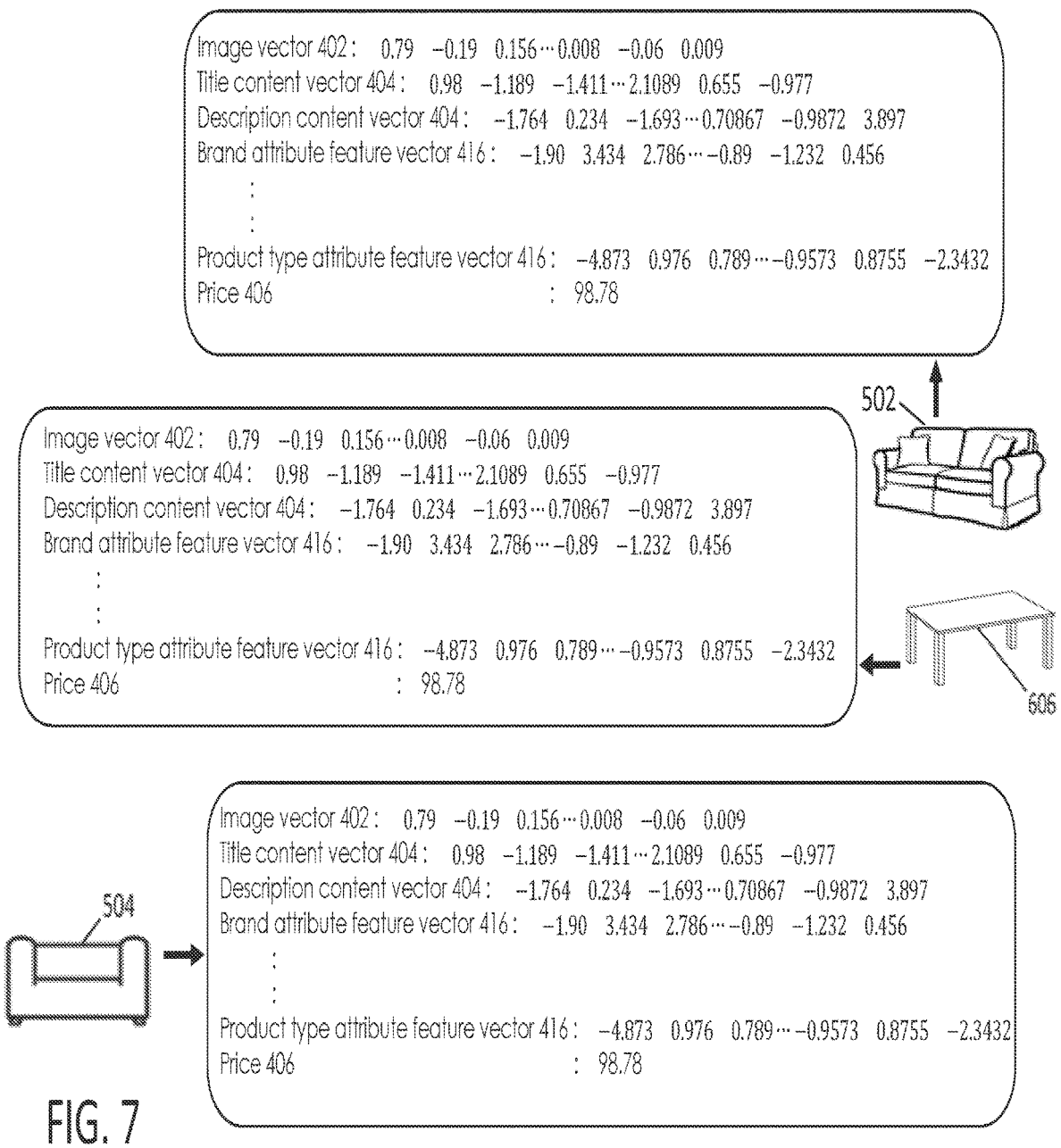
FIG. 7 illustrates generated example vectors for example items for an item corpus.

Feature vectors 420 for the candidate pairs of items are generated (306), preferably by the model training engine 202. In one or more cases, the model training engine 202 may generate a feature vector 420 for a candidate pair of items by determining the similarities between one or more of the attribute vectors 416, content vectors 404, price 406, image vectors 402 of the given item (e.g., anchor item 502) and one or more of the attribute vectors 416, content vectors 404, price vectors 406, image vectors 402 of the recommended item within the candidate pair. FIG. 7 illustrates example vectors and example price values for items 502, 504, and 606 used to generate the example feature vectors as shown in FIG. 8. The model training engine 202 may, for example, generate feature vector 800 for the anchor item 502 and the recommended item 504, another feature vector 802 for the anchor item 502 and the recommended item 506, and another feature vector 804 for the anchor item 502 and the recommended item 606. In one or more cases, the model training engine 202 may generate similarity scores 806 for one or more of the similarities (e.g., the brand similarity score 808, the product type similarity score 810, RH similarity score, and PS similarity score) between the attribute feature vectors 416 of the anchor item (e.g., anchor item 502) and the attribute feature vectors 416 of the corresponding recommended item (e.g., recommended item 504); similarities (e.g. the title similarity score 812 and the description similarity score 814) between the content vectors 404 of the anchor item and the content vectors 404 of the corresponding recommended item; price similarities between the anchor item and the corresponding recommended item; and image vector similarities (e.g., the image similarity score 816) between the anchor item and the corresponding recommended item.

Having determined the feature vectors 420, weights for the feature vectors 420 are determine (308), preferably by the model training engine 202. In one or more cases, the model training engine 202 may determine one or more weights of the feature vectors 420 by applying a logistic regression model 422 to the feature vectors 420 and generating logistic regression weights 424 for the feature vectors 420. For example, the model training engine 202 may apply the logistic regression model 422 to the feature vector 800, 802, and 804, and generate a weight of 2.342 for the image vectors 402, a weight of 0.89 for the title content vectors 404, a weight of 1.12 for the description content vectors 404, and a weight of 2.57 for the product type attribute feature vectors 416. In one or more cases, the model training engine 202 may store the logistic regression weights 424 in the model repository 206.

Figure 9:
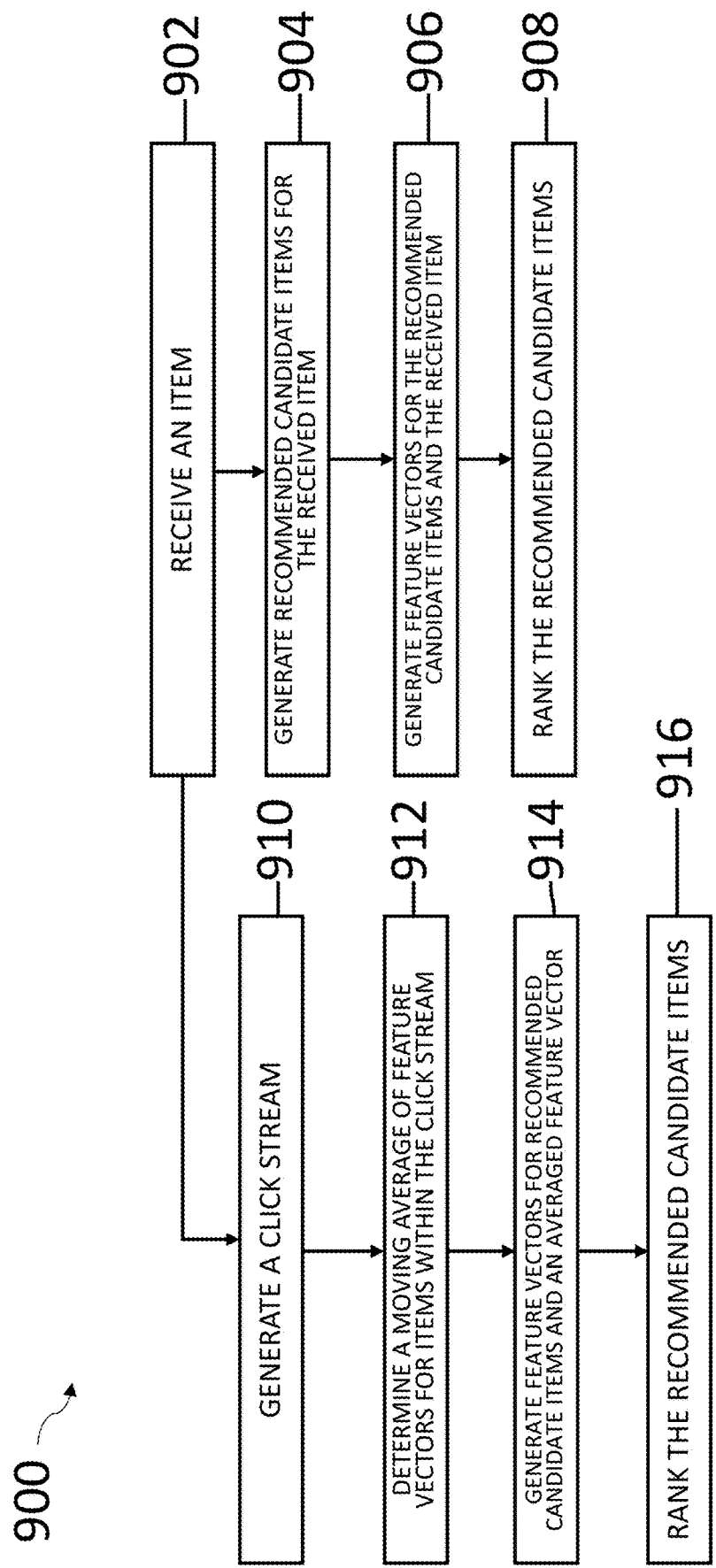
FIG. 9 is a flowchart illustrating a process of executing the item recommendation model.
Figure 11:
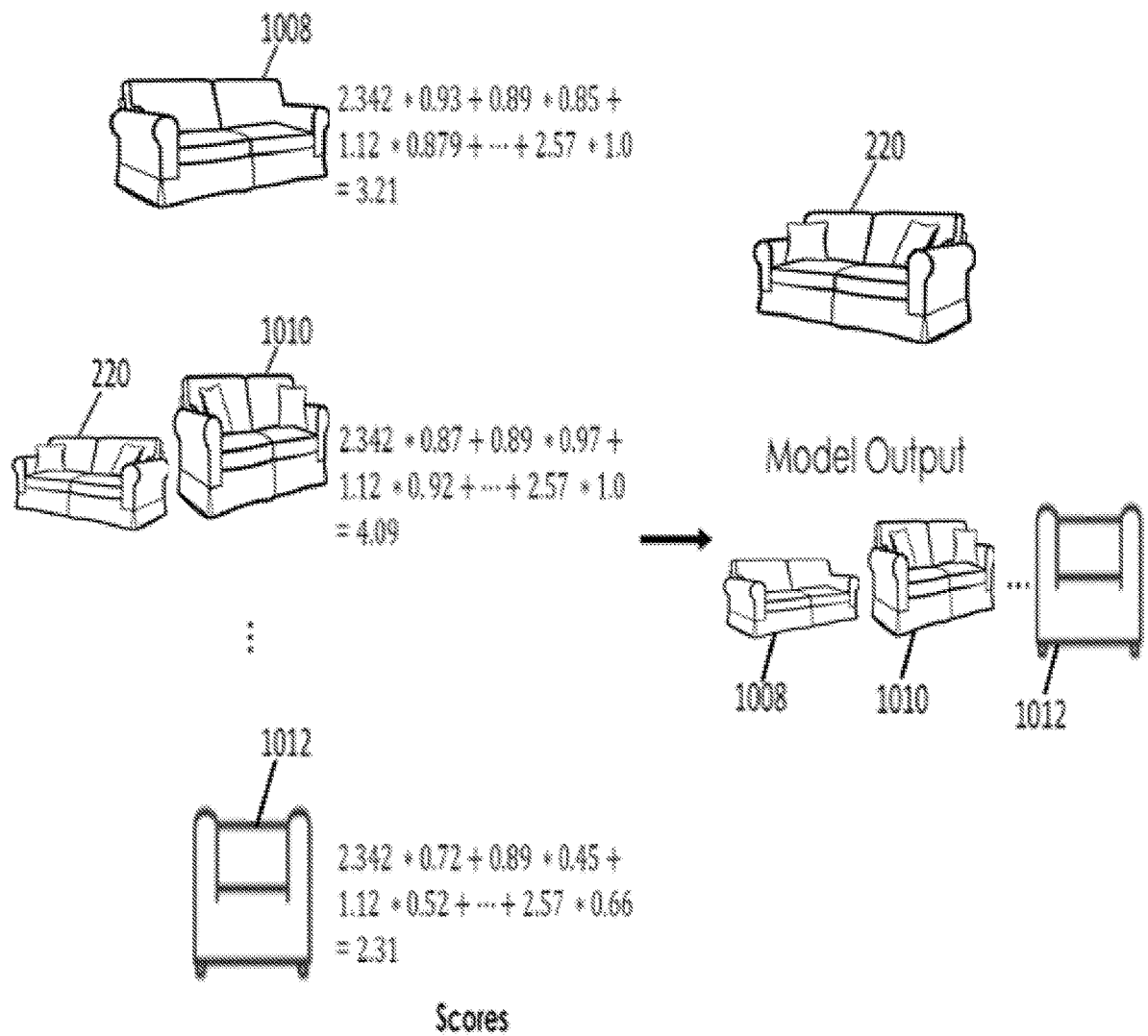
FIG. 11 illustrates an example ranking for example recommended candidate items.
Figure 12:
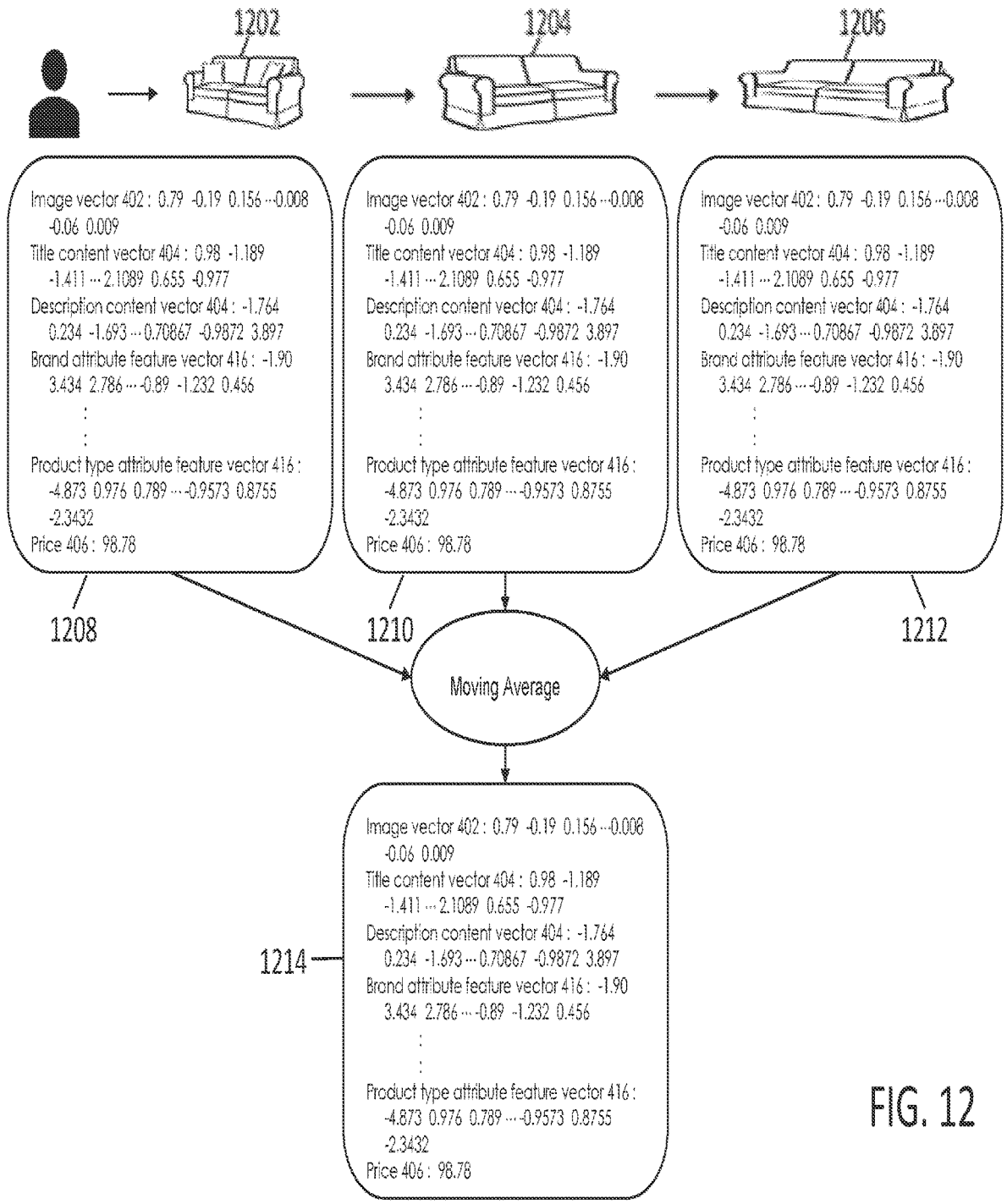
FIG. 12 illustrates example averaged feature vectors for a customer's short-term preference.
Figure 13:
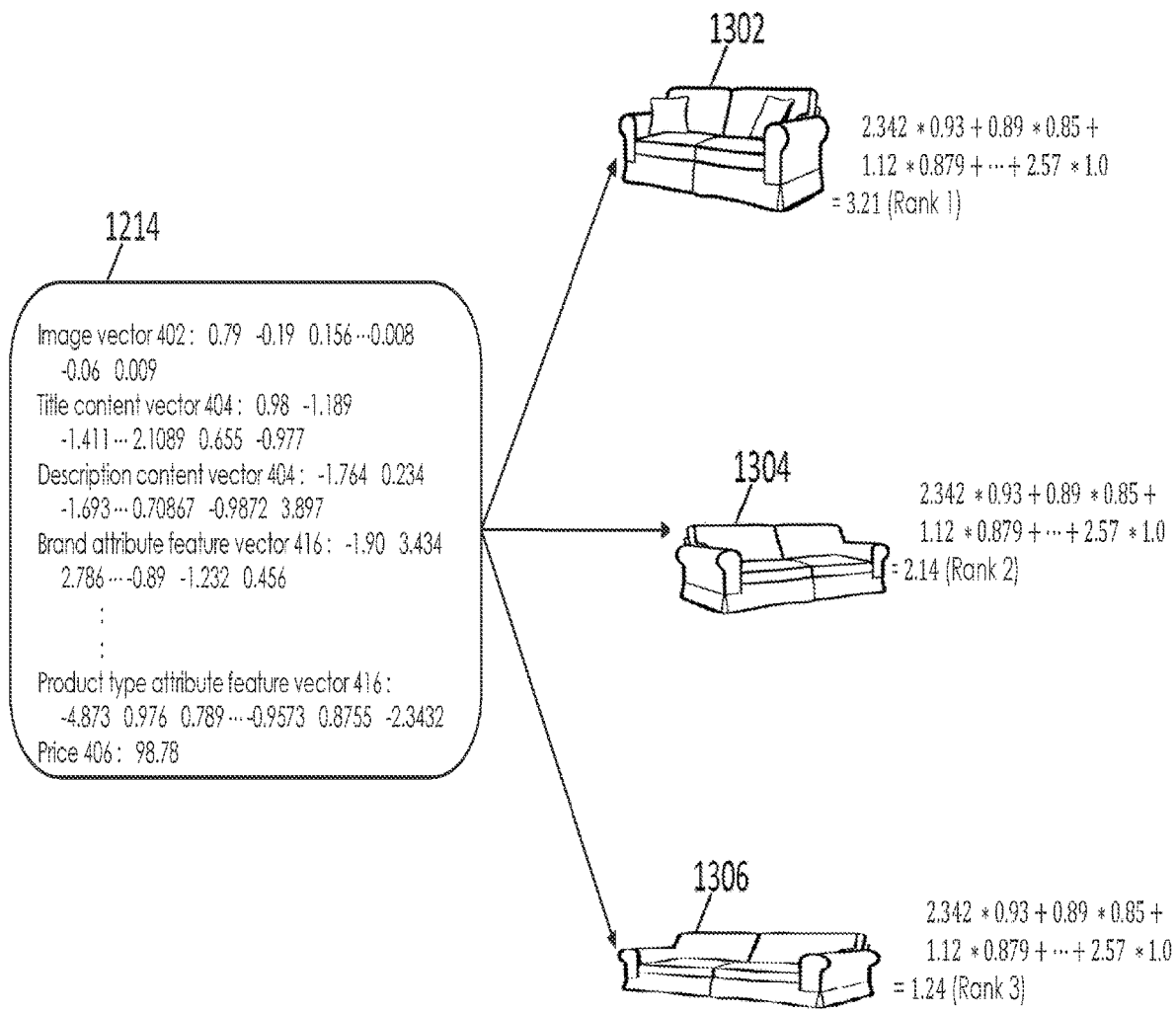
FIG. 13 illustrates an example ranking for example recommended candidate items based on the example averaged feature vectors.

FIG. 9 is a flowchart illustrating a process 900 of executing the item recommendation model.

An item 220 may be received (902), preferably by the model execution engine 210. In one or more cases, the model execution engine 210 may receive an item when, for example, a customer clicks on an item 220 to view the item 220 on the e-commerce website via the computing device 114. In one or more other cases, a customer may click on the item 220 to add the item 220 to the customer's online shopping cart. In yet one or more other cases, an operator of the e-commerce website may upload the item 220, via a computing device 118, to sell on the e-commerce website. In one or more cases, the system 102, and preferably the model execution engine 210, may determine whether the item 220 is a cold start item. In one or more cases, a cold start item may be an item that is new to the e-commerce website and does not include user interaction data, such as, but not limited to, co-view data and/or co-purchase data, or an item that does not have enough user interaction data for the system 102 to recommend complimentary or similar items. Co-view data may be data that indicates a set of items (e.g., an anchor item and a similar item or complementary item to the anchor item) that a customer viewed within a session. Co-purchase data may be data that indicates a set of items (e.g., an anchor item and a similar item or complementary item to the anchor item) that a customer purchased within a session. While the examples are described with respect to receiving and providing item recommendations for a cold start item, it should be noted that the embodiments discussed herein contemplate receiving and providing item recommendations for items that have enough user interaction data for the system 102 to recommend complimentary or similar items.

Recommended candidate items are generated for the received item 220 (904), preferably by the model execution engine 210. In one or more cases, the model execution engine 210 generates recommended candidate items for the received item 220 based on one or both image vectors and content vectors. For example, the model execution engine 210 may determine image features of the received item 220 and generates image vectors for the received item 220. The model execution engine 210 may generate image vectors for the received item 220 in a same or similar manner as described above with respect to the model training engine 202 generating image vectors 402 for the training data. Accordingly, a description of generating the image vectors for the received item 220 is not repeated. In another example, the model execution engine 210 may determine content features, for example content description features, of the received item 220 and generates content description vectors for the received item 220. The model execution engine 210 may generate content description vectors for the received item 220 in a same or similar manner as described above with respect to the model training engine 202 generating content description vectors 404 for the training data. Accordingly, a description of generating the content vectors for the received item 220 is not repeated.

In one or more cases, having generated the image vectors for the received item 220, the model execution engine 210 determines a pool of recommended candidate items that are visually similar to the received item 220 (e.g., the top 200 items that are visually similar to the received item 220). In one or more cases, the model execution engine 210 may determine the pool of recommended candidate items using an approximate nearest neighbor method. In one or more cases, having generated the content vectors for the received item 220, the model execution engine 210 determines a pool of recommended candidate items that have similar descriptions to the received item 220 (e.g., the top 200 items that have similar descriptions to the received item 220).

Feature vectors for the recommended candidate items and the received item 220 are generated (906), preferably by the model execution engine 220. In one or more cases, the model execution engine 210 may generate the feature vectors for the recommended candidate items and the received item 220 in a same or similar manner as described with respect to the model training engine 202 generating the feature vectors 420 for the candidate pairs of items. Accordingly, a description of generating the feature vectors for the recommended candidate items and the received item 220 is not repeated. In an example, the model execution engine 220 may generate feature vector 1002 for received item 220 and recommended candidate item 1008; feature vector 1004 for received item 220 and recommended candidate item 1010; and feature vector 1006 for received item 220 and recommended candidate item 1012, as shown in FIG. 10.

The recommended candidate items are ranked (908), preferably by the model execution engine 210. In one or more cases, the model execution engine 210 ranks the recommended candidate items based on their relevance to the received item 220. To rank the recommended candidate items, the model execution engine 210 applies the logistic regression weights 424 of the feature vector 420 for the recommended candidate item to the corresponding similarity score (e.g., but not limited to, an image similarity score 1014, a title similarity score 1016, a description similarity score 1018, a brand similarity score 1020, and a product type similarity score 1022) of the feature vectors that were generated by the model execution engine 210. The model execution engine 210 may aggregate each weight of the feature vector 420 applied to the corresponding similarity score of the feature vector generated for the received item 220, thereby generating a relevance score for the recommended candidate item. For example, for the feature vector 1002 the includes item 220 and recommended candidate item 1008, the model execution engine 210 may generate a score of 3.21 for the recommended candidate item 1008. In another example, for the feature vector 1004 that includes item 220 and recommended candidate item 1010, the model execution engine 210 may generate a score of 4.09 for the recommended candidate item 1010. In another example, for the feature vector 1006 that includes item 220 and recommended candidate item 1012, the model execution engine 210 may generate a score of 2.31 for the recommended candidate item 1012. In one or more cases, the model execution engine 210 may rank item 1008, item 1010, and item 1012 as being most relevant to least relevant to item 220, based on their generated scores. In one or more cases, the model execution engine 220 may output the ranked items 1008, 1010, and 1012 to the customer's computing device 114, in order to recommend these items as being similar or complementary to the item 220. The computing device 114 may display these ranked items on the e-commerce website to the customer.

For the one or more cases in which a customer clicks on the item 220 and proceeds to click on one or more other items, the system 102, and preferably the model execution engine 210, generates a click stream (910). For example, the model execution engine 210 may determine that the customer clicks on item 1202, then clicks on item 1204, and then clicks on item 1206 within a session, the model execution engine 210 generates a click stream that includes items 1202, 1204, and 1206. Having generated a click stream, a moving average of feature vectors for the items clicked on within the click stream is determined (912), preferably by the model execution engine 210. In one or more cases, the model execution engine 210 may determine a moving average (i.e., an averaged feature vector) by retrieving the feature vectors 420 for the items within the click stream from the model repository 206, and averaging these feature vectors to generate a customer's short-term preference (i.e., a customer embedding). For example, the model execution engine 210 may retrieve the feature vectors 1208 for item 1202, the feature vectors 1210 for item 1204, and the feature vectors 1212 for item 1206. The model execution engine 210 may average the feature vectors 1208, 1210, and 1212 to generate averaged feature vectors 1214.

It is noted that the model execution engine 210 determines the averaged feature vectors 1214 based on the average of feature vectors 1208, 1210, and 1212, as an example; but it should be understood that the model execution engine 210 may determine a moving average of feature vectors when the model execution engine 210 generates a click stream that includes at least two items, i.e., a user clicked on two items within a session. In one or more cases, the model execution engine 210 may be configured to determine a moving average as a new item is added to the click stream, in which the moving average is based on the average of the items within the click stream and the newly clicked on item.

Having determined the averaged feature vectors, the model execution engine 210 may generate the feature vectors for recommended candidate items and the averaged feature vector (914). In one or more cases, the model execution engine 210 may generate recommended candidate items based on the last received item in the click stream. That is, the model execution engine 210 may generate recommended candidate items for the item the customer is currently viewing. In one or more cases, the model execution engine 210 may generate recommended candidate items for the last item within the click stream based on one or both image vectors 402 and content vectors 404 of the last item. The model execution engine 210 may generate the recommended candidate items for the last item in a same or similar manner as generating the recommended candidate items for the received item 220. Accordingly, a description of such features is not repeated. In one or more cases, the model execution engine 210 may generate the feature vectors for the recommended candidate items of the last item and the averaged feature vector in a same or similar manner as described with respect to the model training engine 202 generating the feature vectors 420 for the candidate pairs of items. For instance, based on the feature vectors for the recommended candidate items and the averaged feature vector, the model execution engine 210 may generate similarity scores for one or more of the similarities (e.g., the brand similarity and the product type similarity) between the attribute feature vectors for a recommended candidate item and the averaged attribute feature vector; similarities (e.g. the title similarity and the description similarity) between the content feature vectors for the recommended candidate item and the averaged content feature vectors; price similarities between the recommended candidate item and the last item in the click stream; and image vector similarities (e.g., the image similarity) between the image feature vectors of the recommended candidate item and the averaged feature vector.

The recommended candidate items are ranked (916), preferably by the model execution engine 210. In one or more cases, the model execution engine 210 ranks the recommended candidate items based on their relevance to the last received item within the click stream. To rank the recommended candidate items, the model execution engine 210 applies the logistic regression weights 424 of the feature vectors 420 for a recommended candidate item to the corresponding similarity score (e.g., but not limited to, an image similarity score, a title similarity score, a description similarity score, a brand similarity score, and a product type similarity score) of the feature vectors that were generated using the averaged feature vector. The model execution engine 210 may aggregate each weight of the feature vector 420 of the recommended candidate item applied to the corresponding similarity score of the averaged feature vector, thereby generating a relevance score for the recommended candidate item. For example, the model execution engine 210 may generate a score of 3.21 for the recommended candidate item 1302. In another example, the model execution engine 210 may generate a score of 2.14 for the recommended candidate item 1304. In another example, the model execution engine 210 may generate a score of 1.24 for the recommended candidate item 1306. In one or more cases, the model execution engine 210 may rank item 1302, item 1304, and item 1306 as being most relevant to least relevant based their generated scores. In one or more cases, the model execution engine 220 may output the ranked items 1302, 1304, and 1306, to the customer's computing device 114, in order to recommend these items as being similar or complementary to the last item, e.g., item 1206, that the customer viewed in the click stream. The computing device 114 may display these ranked items on the e-commerce website to the customer.

In one or more cases, the model execution engine 210 may implement operations 910, 912, 914, and 916 of process 900 incrementally for each item that a customer views in a session. For example, for the cases in which a customer clicks on items 1202 and 1204 in which item 1204 is displayed on the computing device 114, the model execution engine 210 may generate a click stream that includes items 1202 and 1204, and implements operations 912, 914, and 916 to provide ranked recommended items for item 1204. If the customer proceeds to click on item 1206 in which item 1206 is now displayed on the computing device 114, the model execution engine 210 may generate a click stream that includes items 1202, 1204, and 1206, and implements operations 912, 914, and 916 to provide ranked recommended items for item 1206 as discussed herein.

The embodiments described herein are directed to providing item-to-item recommendations. To provide item-to-item recommendations for cold start items, the embodiments may generate recommended item candidate data by leveraging data from weights of features of candidate pairs of items. That is, the system and processes described herein may learn feature weights from existing user interaction data, and use the feature weights to generate recommended items for cold start items. In one or more examples, compared to the recommended items provided by conventional navigational models, the system and processes described herein may increase the lift in user interaction on the e-commerce website, such as on the an add-to-cart page. Additionally, in one or more examples, compared to conventional navigational models, the system and processes described herein may increase item page views from customers. Moreover, by leveraging data from weights of existing user interaction data, the system and processes described herein may recommend a wider variety of items to a customer than conventional navigational models, and thereby improve coverage items, for example, but not limited to, cold start items.

Figure 14:
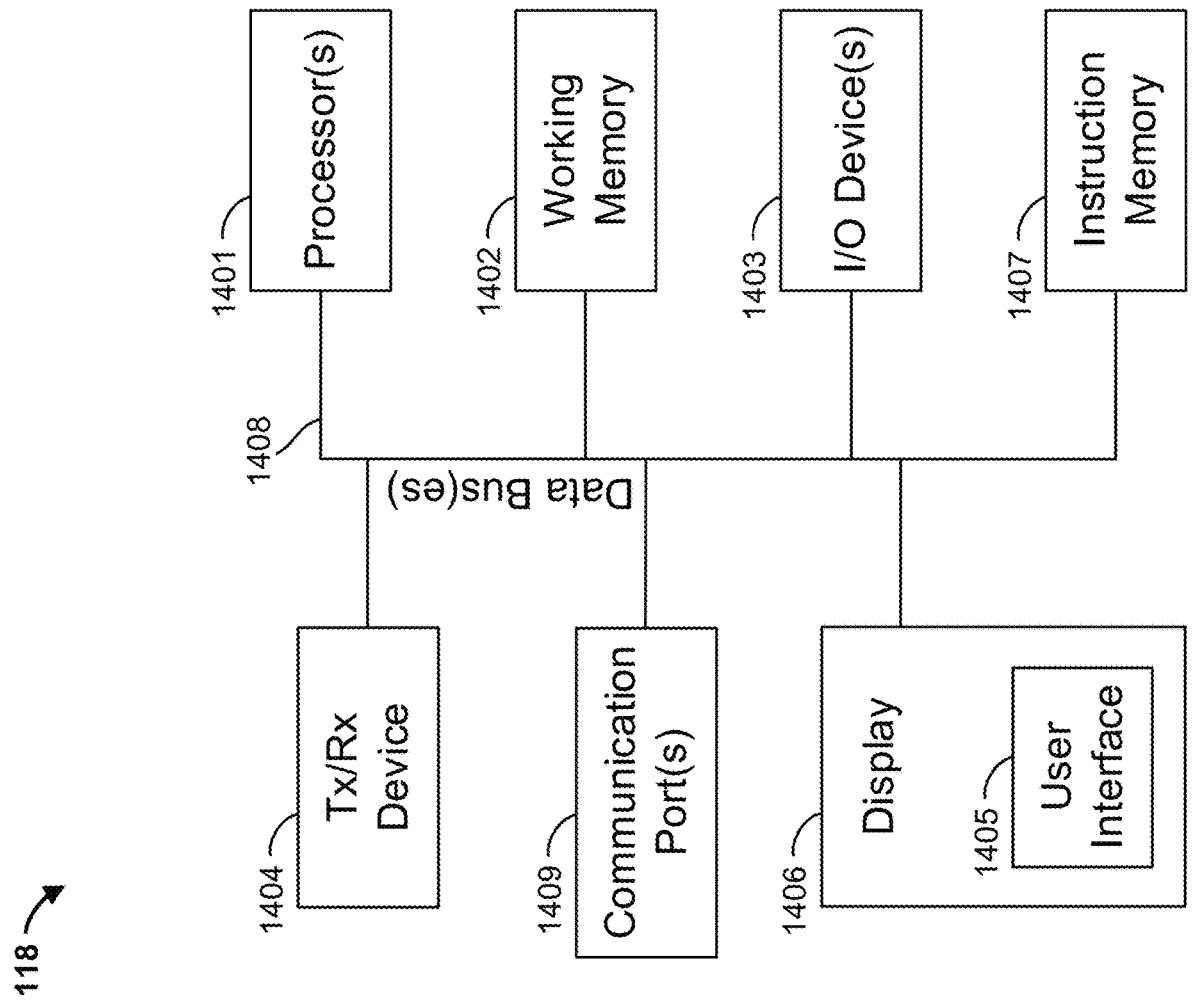
FIG. 14 depicts a block diagram of components of a computing device capable of performing the processes described herein, in accordance with one or more embodiments.

FIG. 14 depicts a block diagram of components of a computing device capable of performing the processes described herein. In particular, FIG. 14 illustrates an example computing device, such as computing device 118, capable of interacting with the system 102 of FIG. 1.

Computing device 118 can include one or more processors 1401, working memory 1402, one or more input/output devices 1403, instruction memory 1407, a transceiver 1404, one or more communication ports 1409, and a display 1406, all operatively coupled to one or more data buses 1408. Data buses 1408 allow for communication among the various devices. Data buses 1408 can include wired, or wireless, communication channels.

Processors 1401 can include one or more distinct processors, each having one or more cores. Each of the distinct processors can have the same or different structure. Processors 1401 can include one or more central processing units (CPUs), one or more graphics processing units (GPUs), application specific integrated circuits (ASICs), digital signal processors (DSPs), and the like.

Processors 1401 can be configured to perform a certain function or operation by executing code, stored on instruction memory 1407, embodying the function or operation. For example, processors 1401 can be configured to perform one or more of any function, method, or operation disclosed herein.

Instruction memory 1407 can store instructions that can be accessed (e.g., read) and executed by processors 1401. For example, instruction memory 1407 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 1401 can store data to, and read data from, working memory 1402. For example, processors 1401 can store a working set of instructions to working memory 1402, such as instructions loaded from instruction memory 1407. Processors 1401 can also use working memory 1402 to store dynamic data created during the operation of the system 102. Working memory 1402 can be a random access memory (RAM) such as a static random access memory (SRAM) or dynamic random access memory (DRAM), or any other suitable memory.

Input-output devices 1403 can include any suitable device that allows for data input or output. For example, input-output devices 1403 can include one or more of a keyboard, a touchpad, a mouse, a stylus, a touchscreen, a physical button, a speaker, a microphone, or any other suitable input or output device.

Communication port(s) 1409 can include, for example, a serial port such as a universal asynchronous receiver/transmitter (UART) connection, a Universal Serial Bus (USB) connection, or any other suitable communication port or connection. In some examples, communication port(s) 1409 allows for the programming of executable instructions in instruction memory 1407. In some examples, communication port(s) 1409 allow for the transfer (e.g., uploading or downloading) of data, such as transaction data.

Display 1406 can display user interface 1405. User interfaces 1405 can enable user interaction with, for example, computing device 112 or 118. For example, user interface 1405 can be a user interface for an application of a retailer that allows a customer to purchase one or more items from the retailer. In some examples, a user can interact with user interface 1405 by engaging input-output devices 1403. In some examples, display 1406 can be a touchscreen, in which the touchscreen displays the user interface 1405.

Transceiver 1404 allows for communication with a network, such as the communication network 118 of FIG. 1. For example, if network 106 of FIG. 1 is a cellular network, transceiver 1404 is configured to allow communications with the cellular network. In some examples, transceiver 1404 is selected based on the type of network 106 system 102 will be operating in. Processor(s) 1401 is operable to receive data from, or send data to, a network, such as network 106 of FIG. 1, via transceiver 1404.

Although the embodiments discussed herein are described with reference to the figures, it will be appreciated that many other ways of performing the acts associated with the embodiments can be used. For example, the order of some operations may be changed, and some of the operations described may be optional.

In addition, the embodiments described herein can be at least partially implemented in the form of computer-implemented processes and apparatus. The disclosed embodiments may also be at least partially implemented in the form of tangible, non-transitory machine-readable storage media encoded with computer program code. For example, the processes described herein can be implemented in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the embodiments. The embodiments may also be at least partially implemented in the form of a computer into which computer program code is loaded or executed, such that, the computer becomes a special purpose computer for practicing the embodiments. When implemented on a general-purpose processor, the computer program code segments configure the processor to create specific logic circuits. The embodiments may alternatively be at least partially implemented in application specific integrated circuits for performing the embodiments.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A system comprising:
    a memory having instructions stored thereon, and a processor configured to read the instructions to:
        extract, by the processor, feature data for a plurality of items, wherein the feature data comprises at least one of attribute data, content data, and image data;
        embed the image data of the plurality of items to reduce dimensionality of the image data based on at least one of a deep learning analysis or a latent semantic analysis;
        convert the feature data for the plurality of items into feature vectors for the plurality of items, wherein the feature vectors comprise at least one of an attribute vector, a content vector, and an image vector;
        determine a degree of similarity between each of the plurality of items based, at least in part, on a distance between each of the feature vectors for the plurality of items;
        generate, by the processor, one or more weights for each of the feature vectors based, at least in part, on a logistic regression model;
        receive data for an item of a click stream;
        generate data for a recommended candidate item for the data of the received item, based on image data similarity between a candidate item corresponding to the recommended candidate item data and the data of the received item;
        generate feature data of the recommended candidate item data and the data of the received item, the feature data comprising one or more similarities between the data of the received item and data corresponding to a respective recommended candidate item, wherein the feature data of the data of the received item and the recommended candidate item data are converted into a received item vector and a recommended candidate item vector, respectively;

determine a degree of similarity between the data of the received item and the recommended candidate item data based on a distance between the received item vector and the recommended candidate item vector;

generate ranked recommended candidate item data based on the received item vector, the recommended candidate item vector, and the generated one or more weights for each of the feature vectors determined for candidate test item data, wherein the candidate test item data comprises data corresponding to the recommended candidate item data; and output the generated ranked recommended candidate item data wherein the generated ranked recommended candidate item data is based on a last received item within the click stream.

2. The system of claim 1, wherein the item is a cold start item and the processor is further configured to read the instructions to generate, based on the image data similarity between the candidate item and the received cold start item, the recommended candidate item data of the received cold start item.

3. The system of claim 1, wherein the processor is further configured to generate the recommended candidate items based on content data similarity between the candidate item and the received item.

4. The system of claim 1, wherein the processor is further configured to:
receive data for at least another item in a sequential order and generate a click stream for the received item and the at least another item; and
determine averaged feature data of the received item and the at least another item within the click stream.

5. The system of claim 4, wherein the processor is further configured to:
generate recommended candidate items for the at least another item within the click stream;
generate feature data of the averaged feature data and the recommended candidate items for the at least another item; and
rank the recommended candidate items for the at least another item.

6. The system of claim 1, wherein the candidate test item data comprises one or more of image data of the recommended candidate item data, content data of the recommended candidate item data, price data of the recommended candidate item data, and categorical data of the recommended candidate item data.

7. The system of claim 6, wherein the processor is further configured to:
generate data for candidate test pairs of items based on click stream training data;
generate feature data for the data for the candidate pairs of items; and
determine at least one weight for the feature data of the candidate test item data.

8. A method comprising:
extracting, by at least one processor, feature data for a plurality of items, wherein the feature data comprises at least one of attribute data, content data, and image data;
embedding the image data of the plurality of items to reduce dimensionality of the image data based on at least one of a deep learning analysis or a latent semantic analysis;
converting, by the at least one processor, the feature data for the plurality of items into feature vectors for the plurality of items, wherein the feature vectors comprise at least one of an attribute vector, a content vector, and an image vector;

determining, by the at least one processor, a degree of similarity between each of the plurality of items based, at least in part, on a distance between each of the feature vectors for the plurality of items;

generating, by the at least one processor, one or more weights for each of the feature vectors based, at least in part, on a logistic regression model;

receiving, by the at least one processor, data for an item of a click stream;

generating, by the at least one processor, data for a recommended candidate item for the data of the received item, based on image data similarity between a candidate item corresponding to the recommended candidate item data and the data of the received item;

generating, by the at least one processor, feature data of the recommended candidate item data and the data of the received item, the feature data comprising one or more similarities between the data of the received item and data corresponding to a respective recommended candidate item, wherein the feature data of the data of the received item and the recommended candidate item data are converted into a received item vector and a recommended candidate item vector, respectively;

determining, by the at least one processor, a degree of similarity between the data of the received item and the recommended candidate item data based on a distance between the received item vector and the recommended candidate item vector;

generating, by the at least one processor, ranked recommended candidate item data based on the received item vector, the recommended candidate item vector, and the generated one or more weights for each of the feature vectors determined for candidate test item data, wherein the candidate test item data comprises data corresponding to the recommended candidate item data; and outputting the generated ranked recommended candidate item data, wherein the generated ranked recommended candidate item data is based on a last received item within the click stream.

9. The method of claim 8, wherein the item is a cold start item, and generating the recommended candidate item data comprises generating, based on the image data similarity between the candidate item and the received cold start item, the recommended candidate item data of the received cold start item.

10. The method of claim 8, wherein generating the recommended candidate items comprises generating the recommended candidate items based on content data similarity between the candidate item and the received item.

11. The method of claim 8, further comprising:
receiving, by the at least one processor, data for at least another item in a sequential order and generating, by the at least one processor, a click stream for the received item and the at least another item; and
determining, by the at least one processor, averaged feature data of the received item and the at least another item within the click stream.

12. The method of claim 11, further comprising:
generating, by the at least one processor, recommended candidate items for the at least another item within the click stream;

generating, by the at least one processor, feature data of the averaged feature data and the recommended candidate items for the at least another; and ranking, by the at least one processor, the recommended candidate items for the at least another item.

13. The method of claim 8, wherein the candidate test item data comprises one or more of image data of the recommended candidate item data, content data of the recommended candidate item data, price data of the recommended candidate item data, and categorical data of the recommended candidate item data.

14. The method of claim 13, further comprising:

generating, by the at least one processor, data for candidate test pairs of items based on click stream training data;

generating, by the at least one processor, feature data for the data for the candidate pairs of items; and determining, by the at least one processor, at least one weight for the feature data of the candidate test item data.

15. A computer program product comprising:

a non-transitory computer readable medium having program instructions stored thereon, the program instructions executable by one or more processors, the program instructions comprising:

extracting, by the one or more processors, feature data for a plurality of items, wherein the feature data comprises at least one of attribute data, content data, and image data;

embedding the image data of the plurality of items to reduce dimensionality of the image data based on at least one of a deep learning analysis or a latent semantic analysis;

converting, by the one or more processors, the feature data for the plurality of items into feature vectors for the plurality of items, wherein the feature vectors comprise at least one of an attribute vector, a content vector, and an image vector;

determining, by the one or more processors, a degree of similarity between each of the plurality of items based, at least in part, on a distance between each of the feature vectors for the plurality of items;

generating, by the one or more processors, one or more weights for each of the feature vectors based, at least in part, on a logistic regression model;

receiving data for an item of a click stream;

generating data for a recommended candidate item for the data of the received item, based on image data similarity between a candidate item corresponding to the recommended candidate item data and the data of the received item;

generating feature data of the recommended candidate item data and the data of the received item, the feature data comprising one or more similarities between the data of the received item and data corresponding to a respective recommended candidate item, wherein the feature data of the data of the received item and the recommended candidate item data are converted into a received item vector and a recommended candidate item vector, respectively;

determining, by the one or more processors, a degree of similarity between the data of the received item and the recommended candidate item data based on a distance between the received item vector and the recommended candidate item vector;

generating ranked recommended candidate item data based on the data and the generated one or more weights for each of the feature vectors determined for candidate test item data, wherein the candidate test item data comprises data corresponding to the recommended candidate item data; and outputting the generated ranked recommended candidate item data, wherein the generated ranked recommended candidate item data is based on a last received item within the click stream.

16. The computer program product of claim 15, wherein:

the item is a cold start item; and generating the recommended candidate items comprises generating, based on the image data similarity between the candidate item and the received cold start item and content data similarity between the candidate item and the received item, the recommended candidate item data of the received cold start item.

17. The computer program product of claim 15, wherein the program instructions further comprise:

receiving data for at least another item in a sequential order and generating a click stream for the received item and the at least another item; and determining averaged feature data of the received item and the at least another item within the click stream.

18. The computer program product of claim 17, wherein the program instructions further comprise:

generating recommended candidate items for the at least another item within the click stream;

generating feature data of the averaged feature data and the recommended candidate items for the at least another; and ranking the recommended candidate items for the at least another item.

19. The computer program product of claim 15, wherein the candidate test item data comprises one or more of image data of the recommended candidate item data, content data of the recommended candidate item data, price data of the recommended candidate item data, and categorical data of the recommended candidate item data.

20. The computer program product of claim 19, wherein the program instructions further comprise:

generating data for candidate test pairs of items based on click stream training data;

generating feature data for the data for the candidate pairs of items; and determining at least one weight for the feature data of the candidate test item data.

* * * * *